United States Patent
Kaisto et al.

(10) Patent No.: US 10,462,721 B2
(45) Date of Patent: Oct. 29, 2019

(54) METHOD AND APPARATUS FOR CELL RESELECTION IN MOBILE COMMUNICATIONS

(71) Applicant: MediaTek Singapore Pte. Ltd., Singapore (SG)

(72) Inventors: Antti Kaisto, Oulu (FI); Sakari Niemela, Oulu (FI)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 0 days.

(21) Appl. No.: 16/004,461

(22) Filed: Jun. 11, 2018

(65) Prior Publication Data

US 2019/0166530 A1    May 30, 2019

Related U.S. Application Data

(60) Provisional application No. 62/591,275, filed on Nov. 28, 2017.

(51) Int. Cl.
*H04W 36/08* (2009.01)

(52) U.S. Cl.
CPC .................. *H04W 36/08* (2013.01)

(58) Field of Classification Search
CPC ............... H04L 5/0048; H04L 5/0073; H04L 2025/03426; H04L 5/0023; H04L 5/0026; H04L 27/2657; H04L 5/0053; H04L 5/0037; H04L 27/2671; H04L 27/2672; H04L 27/2686; H04L 27/2659; H04L 27/266; H04W 16/02
See application file for complete search history.

(56) References Cited

U.S. PATENT DOCUMENTS

| | | | |
|---|---|---|---|
| 2006/0166677 A1* | 7/2006 | Derakshan | H04W 36/14 455/453 |
| 2016/0127970 A1* | 5/2016 | Chuang | H04W 4/70 455/436 |
| 2018/0146410 A1* | 5/2018 | Cho | H04W 48/20 |

* cited by examiner

*Primary Examiner* — Nizar N Sivji
(74) *Attorney, Agent, or Firm* — Han IP PLLC; Andy M. Han

(57) ABSTRACT

Various solutions for cell reselection with respect to user equipment and network apparatus in mobile communications are described. An apparatus may receive a redirection frequency and a dedicated frequency offset value corresponding to the redirection frequency. The apparatus may determine a cell-ranking criterion for a serving cell according to the dedicated frequency offset value. The apparatus may further perform cell reselection to a cell on the redirection frequency from the serving cell.

20 Claims, 5 Drawing Sheets

METHOD AND APPARATUS FOR CELL RESELECTION IN MOBILE COMMUNICATIONS

CROSS REFERENCE TO RELATED PATENT APPLICATION(S)

The present disclosure is part of a non-provisional application claiming the priority benefit of U.S. Patent Application No. 62/591,275, filed on 28 Nov. 2017, the content of which is incorporated by reference in its entirety.

TECHNICAL FIELD

The present disclosure is generally related to mobile communications and, more particularly, to cell reselection with respect to user equipment and network apparatus in mobile communications.

BACKGROUND

Unless otherwise indicated herein, approaches described in this section are not prior art to the claims listed below and are not admitted as prior art by inclusion in this section.

There are various well-developed and well-defined cellular communications technologies in telecommunications that enable wireless communications using mobile terminals, or user equipment (UE). For example, the Global System for Mobile communications (GSM) is a well-defined and commonly used communications system, which uses time division multiple access (TDMA) technology, which is a multiplex access scheme for digital radio, to send voice, video, data, and signaling information (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Long-Term Evolution (LTE), as well as its derivatives such as LTE-Advanced and LTE-Advanced Pro, is a standard for high-speed wireless communication for mobile phones and data terminals. In addition, there are some newly developed next generation communication technologies such as $5^{th}$ Generation (5G), New Radio (NR), Internet of Things (IoT) and Narrow Band Internet of Things (NB-IoT). These communication technologies are developed for higher speed transmission and serving for huge number of devices including machine type devices.

In some applications or areas, the network nodes may serve a huge number of devices may need to properly perform load balance among a plurality of network nodes. The network node may assign some preferred cells to the UEs for redirecting the UEs to camp on proper network nodes. However, the UEs may not trigger cell reselection to camp on the preferred cells in some cases and may even reselect away from the preferred cells. This may cause load unbalance and uncontrollable at the network side. The UEs may also unable to get proper services if the UEs may not camp on the preferred cells.

Accordingly, it is important for the UE to properly perform cell reselection and reselect to the preferred cells assigned by the network side. Therefore, in developing communication systems, it is needed to provide methodologies for the UE to properly perform cell reselection.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to performing cell reselection to preferred cells with respect to user equipment and network apparatus in mobile communications.

In one aspect, a method may involve an apparatus receiving a redirection frequency and a dedicated frequency offset value corresponding to the redirection frequency. The method may also involve the apparatus determining a cell-ranking criterion for a serving cell according to the dedicated frequency offset value. The method may further involve the apparatus performing cell reselection to a cell on the redirection frequency from the serving cell.

In one aspect, a method may involve an apparatus receiving a redirection frequency and a dedicated frequency offset value corresponding to the redirection frequency. The method may also involve the apparatus determining a cell-ranking criterion for an intra-frequency neighboring cell according to the dedicated frequency offset value. The method may further involve the apparatus performing cell reselection to a cell on the redirection frequency.

In one aspect, an apparatus may comprise a transceiver capable of wirelessly communicating with a plurality of cells of a wireless network. The apparatus may also comprise a processor communicatively coupled to the transceiver. The processor may be capable of receiving a redirection frequency and a dedicated frequency offset value corresponding to the redirection frequency. The processor may also be capable of determining a cell-ranking criterion for a serving cell according to the dedicated frequency offset value. The processor may further be capable of performing cell reselection to a cell on the redirection frequency from the serving cell.

In one aspect, an apparatus may comprise a transceiver capable of wirelessly communicating with a plurality of cells of a wireless network. The apparatus may also comprise a processor communicatively coupled to the transceiver. The processor may be capable of receiving a redirection frequency and a dedicated frequency offset value corresponding to the redirection frequency. The processor may also be capable of determining a cell-ranking criterion for an intra-frequency neighboring cell according to the dedicated frequency offset value. The processor may further be capable of performing cell reselection to a cell on the redirection frequency.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to cell reselection with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
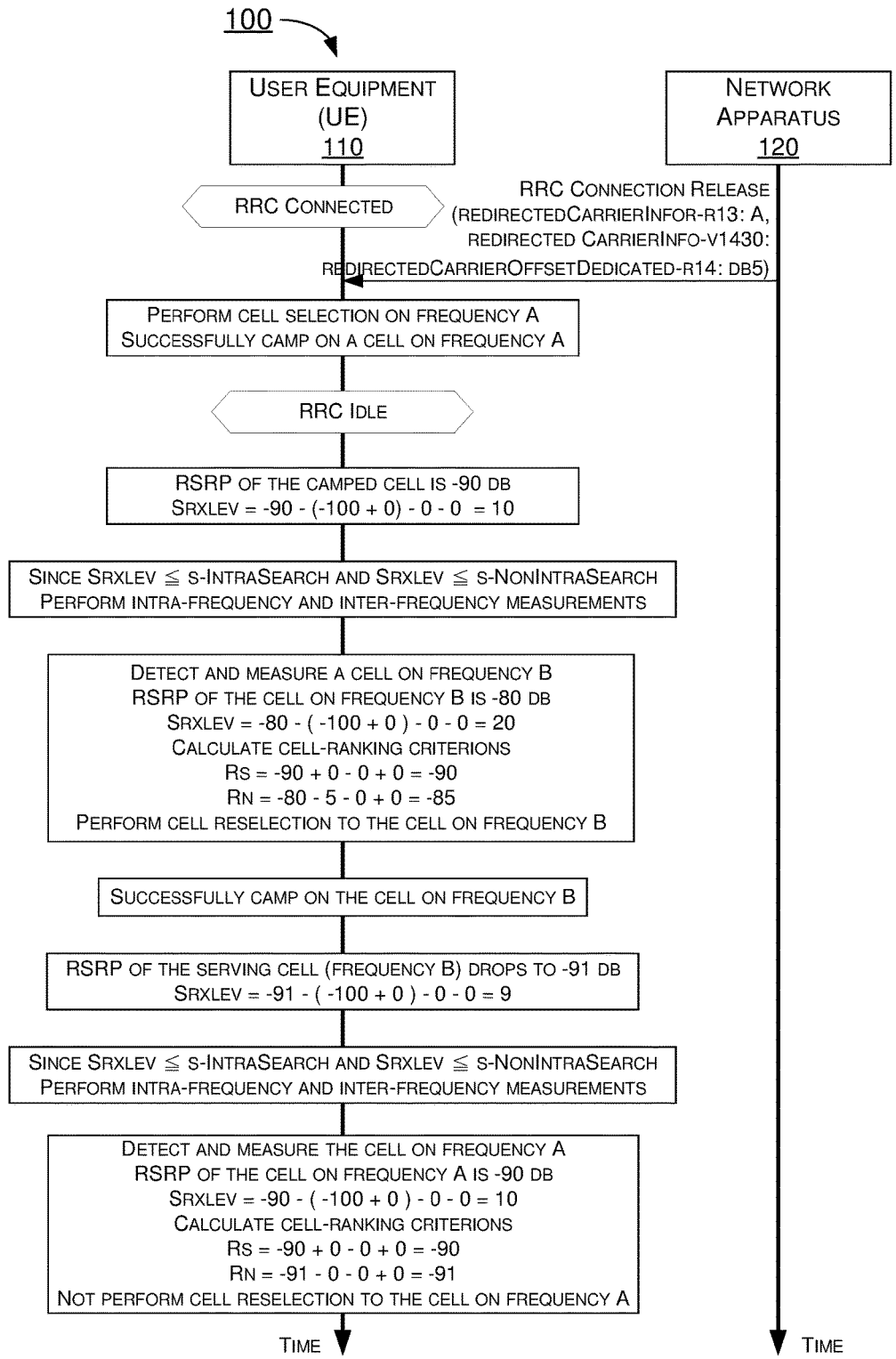
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a user equipment (UE) 110 and a network apparatus 120, which may be a part of a wireless communication network (e.g., a Long-Term Evolution (LTE) network, a LTE-Advanced network, a LTE-Advanced Pro network, a 5$^{th}$ Generation (5G) network, a New Radio (NR) network, an Internet of Things (IoT) network or a Narrow Band Internet of Things (NB-IoT) network). At first, UE 110 may be configured to camp on network apparatus 120 and in a radio resource control (RRC) connected mode.

Then, network apparatus 120 may be configured to send a RRC connection release message (e.g., RRCConnectionRelease) to UE 110. The RRC connection release message may be used for releasing the connection between network apparatus 120 and UE 110 and redirecting UE 110 to a preferred cell. The RRC connection release message may comprise information including a redirection frequency (e.g., redirectedCarrierInfor-r13: Frequency A) and a dedicated frequency offset value corresponding to the redirection frequency (e.g., redirectedCarrierOffsetDedicated-r14: dB5). The redirection frequency may indicate the frequency (e.g., frequency A) of the preferred cell for UE 110 to perform cell selection. The dedicated frequency offset value may be used by UE 110 for determining a cell-ranking criterion when performing cell reselection procedures. The dedicated frequency offset value may be, for example and without limitation, 1 dB, 5 dB, 10 dB, etc. In some implementations, the RRC connection release message may further comprise a timer value (e.g., t322) for the dedicated frequency offset value. The timer value may be used for counting the valid time period for applying the dedicated frequency offset value. The timer value may be, for example and without limitation, 5 minutes, 10 minutes, 20 minutes, etc.

After receiving the RRC connection release message, UE 110 may be configured to perform cell selection to select the cell on frequency A. UE 110 may successfully camp on the cell on frequency A. When UE 110 has no data to receive or transmit, UE 110 may enter into a RRC idle mode. UE 110 may be configured to periodically measure the signal strength of the cell on frequency A. For example, UE 110 may be configured to measure the reference symbol received power (RSRP) of the cell on frequency A. The measured RSRP value may be assumed to be, for example, −90 dB. UE 110 may be further configured to determine a cell selection receive (RX) level value (e.g., Srxlev). Srxlev may be determined according to the following equation.

$$Srxlev = Q_{rxlevmeas} - (Q_{rxlevmin} + Q_{rxlevminoffset}) - Pcompensation - Qoffset_{temp}$$

$Q_{rxlevmeas}$ may represent a measured cell RX level value (e.g., RSRP). $Q_{rxlevmin}$ may represent a minimum required RX level in the cell. $Q_{rxlevminoffset}$ may represent an offset value to the signaled $Q_{rxlevmin}$ taken into account in the Srxlev evaluation. Pcompensation may represent a compensation value in an event that an UE supports the additionalPmax. $Qoffset_{temp}$ may represent an offset value temporarily applied to a cell. The values of $Q_{rxlevmin}$, $Q_{rxlevminoffset}$, Pcompensation and $Qoffset_{temp}$ may be received from or determined according to the system information blocks (SIBs) of the cell on frequency A. In this example, $Q_{rxlevmin}$ may be assumed to be −100 dB. $Q_{rxlevminoffset}$, Pcompensation and $Qoffset_{temp}$ may be assumed to be 0. Srxlev may be determined as 10 dB (i.e., −90−(−100+0)−0−0=10).

UE 110 may be further configured to determine whether Srxlev is less than or equal to a first threshold value (e.g., s-IntraSearch) and a second threshold value (e.g., s-NonIntraSearch). The values of s-IntraSearch and s-NonIntraSearch may be received from the SIB of the cell on frequency A. In this example, both s-IntraSearch and s-NonIntraSearch may be assumed to be 15. Accordingly, Srxlev (e.g., 10) may be less than or equal to s-IntraSearch and s-NonIntraSearch. Since Srxlev is less than or equal to the first threshold value and the second threshold value, UE 110 may be configured to perform intra-frequency and inter-frequency measurements.

The SIB may further carry a frequency list of at least one neighboring cell (e.g., frequency B). UE 110 may be configured to detect and measure the cell on frequency B. Assuming that the measured RSRP of the neighboring cell on frequency B may equal to −80 dB, UE 110 may be configured to determine that Srxlev may equal to 20 (i.e., −80−(−100+0)−0−0=20). UE 110 may be further configured to determine the cell-ranking criterions $R_s$ for the serving cell and $R_n$ for the neighboring cell according to the following equations.

$$R_s = Q_{meas,s} + Q_{Hyst} - Q\text{offset}_{temp} + Q\text{offset}_{SCPTM}$$

$$R_n = Q_{meas,n} - Q\text{offset} - Q\text{offset}_{temp} + Q\text{offset}_{SCPTM}$$

$Q_{meas}$ may represent a RSRP measurement quality used in cell reselections. Qoffset may represent an offset value for applying to an inter-frequency. $Q\text{offset}_{temp}$ may represent an offset value temporarily applied to a cell. $Q\text{offset}_{SCPTM}$ may represent an offset value temporarily applied to a single cell point to multi-point (SC-PTM) frequency.

In this example, both $Q\text{offset}_{temp}$ and $Q\text{offset}_{SCPTM}$ may be assumed to be 0. Qoffset may equal to QoffsetDedicated$_{frequency}$ for any frequency other than the frequency of the dedicated frequency offset value. QoffsetDedicated$_{frequency}$ may be the dedicated frequency offset value corresponding to the redirection frequency (e.g., redirectedCarrierOffsetDedicated-r14: dB5). Since the frequency of the neighboring cell (e.g., frequency B) is other than the frequency of the dedicated frequency offset value (e.g., frequency A), Qoffset may equal to 5. The cell-ranking criterion $R_s$ for the serving cell (e.g., frequency A) may be determined as −90 (i.e., −90+0−0+0=−90). The cell-ranking criterion $R_n$ for the neighboring cell (e.g., frequency B) may be determined as −85 (i.e., −80−5−0+0=−85). Accordingly, the cell-ranking criterion $R_n$ may be higher than the cell-ranking criterion $R_s$. UE 110 may be configured to perform cell reselection to the neighboring cell (e.g., the cell on frequency B). Then, UE 110 may successfully camp on the cell on frequency B.

After camping on the cell on frequency, UE 110 may be configured to periodically perform RSRP measurements on the cell on frequency B. Assuming that the signal strength of the cell on frequency B may become bad and the measured RSRP of the current serving cell (e.g., the cell on frequency B) may drop to −91 dB, Srxlev may be determined as 9 dB (i.e., −91−(−100+0)−0−0=9).

Similarly, UE 110 may be further configured to determine whether Srxlev is less than or equal to s-IntraSearch and s-NonIntraSearch. The values of s-IntraSearch and s-NonIntraSearch may be received from the SIB of the cell on frequency B. In this example, both s-IntraSearch and s-NonIntraSearch may be assumed to be 15. Accordingly, Srxlev (e.g., 9) may be less than or equal to s-IntraSearch and s-NonIntraSearch. Since Srxlev is less than or equal to the first threshold value and the second threshold value, UE 110 may be configured to perform intra-frequency and inter-frequency measurements.

The SIB may further carry a frequency list of at least one neighboring cell (e.g., frequency A). UE 110 may be configured to detect and measure the cell on frequency A. Assuming that the measured RSRP of the neighboring cell on frequency A may equal to −90 dB, UE 110 may be configured to determine that Srxlev may equal to 10 (i.e., −90−(−100+0)−0−0=10). UE 110 may be further configured to determine the cell-ranking criterions $R_s$ for the serving cell and $R_n$ for the neighboring cell according to the same equations as illustrated above.

In this example, both $Q\text{offset}_{temp}$ and $Q\text{offset}_{SCPTM}$ may be assumed to be 0. Qoffset may equal to 0 since the frequency of the neighboring cell (e.g., frequency A) is the same with the frequency of the dedicated frequency offset value. QoffsetDedicated$_{frequency}$ may not be applied to the frequency of the dedicated frequency offset value. The cell-ranking criterion $R_s$ for the serving cell (e.g., frequency B) may be determined as −90 (i.e., −90+0−0+0=−90). The cell-ranking criterion $R_n$ for the neighboring cell (e.g., frequency A) may be determined as −91 (i.e., −91−0−0+0=−91). Accordingly, the cell-ranking criterion $R_n$ may be lower than the cell-ranking criterion $R_s$. UE 110 may be configured to stay on the current serving cell (e.g., the cell on frequency B) and not perform cell reselection to the neighboring cell (e.g., the cell on frequency A).

It should be noted that the redirection frequency (e.g., frequency A) may be the preferred frequency that UE 110 should stay on. The dedicated frequency offset value corresponding to the redirection frequency (e.g., redirectedCarrierOffsetDedicated-r14: dB5) may be used for UE 110 to have higher chance to reselect to the cell on the redirection frequency. However, in this example, the dedicated frequency offset value is not applied to the frequency of the serving cell when UE 110 camps on the cell on frequency B. The cell-ranking criterion $R_s$ for the serving cell (e.g., frequency B) may be higher than the cell-ranking criterion $R_n$ for the neighboring cell (e.g., frequency A). Therefore, UE 110 may keep staying on the cell on frequency B without higher chance to reselect to the cell on the redirection frequency.

Figure 2:
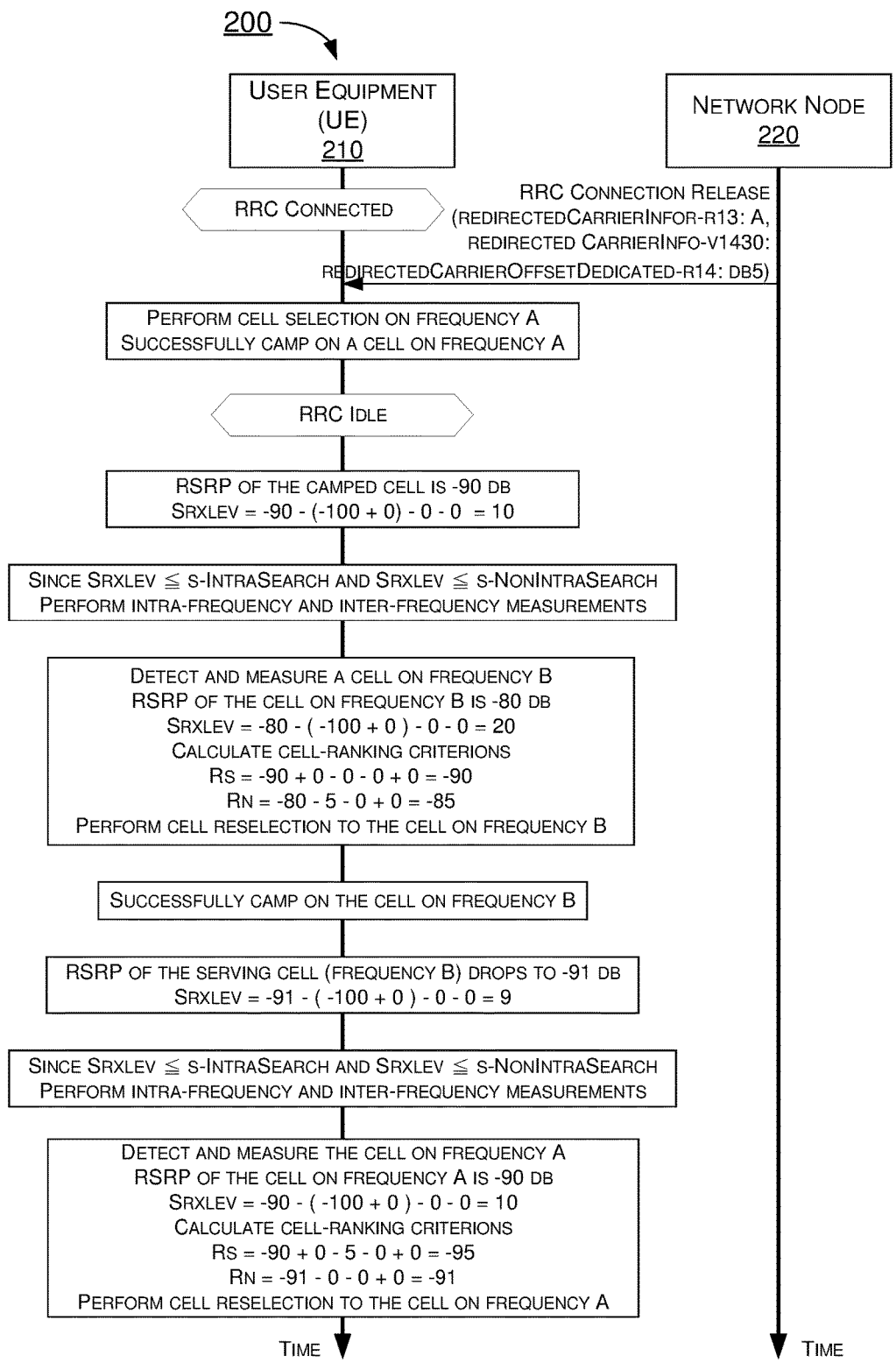
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a user equipment (UE) 210 and a network apparatus 220, which may be a part of a wireless communication network (e.g., a LTE network, a LTE-Advanced network, a LTE-Advanced Pro network, a 5$^{th}$ Generation (5G) network, a New Radio (NR) network, an Internet of Things (IoT) network or a Narrow Band Internet of Things (NB-IoT) network). At first, UE 210 may be configured to camp on network apparatus 220 and in a RRC connected mode. Then, network apparatus 220 may be configured to send a RRC connection release message (e.g., RRCConnectionRelease) to UE 210. The RRC connection release message may be used for releasing the connection between network apparatus 220 and UE 210 and redirecting UE 210 to a preferred cell. The RRC connection release message may comprise information including a redirection frequency (e.g., redirectedCarrierInfor-r13: Frequency A) and a dedicated frequency offset value corresponding to the redirection frequency (e.g., redirectedCarrierOffsetDedicated-r14: dB5). The redirection frequency may indicate the frequency (e.g., frequency A) of the preferred cell for UE 210 to perform cell selection. The dedicated frequency offset value may be used by UE 210 for determining a cell-ranking criterion when performing cell reselection procedures. The dedicated frequency offset value may be, for example and without limitation, 1 dB, 5 dB, 10 dB, etc. In some implementations, the RRC connection release message may further comprise a timer value (e.g., t322) for the dedicated frequency offset value. The timer value may be used for counting the valid time period for applying the dedicated frequency offset value. The timer value may be, for example and without limitation, 5 minutes, 10 minutes, 20 minutes, etc.

After receiving the RRC connection release message, UE 210 may be configured to perform cell selection to select the cell on frequency A. UE 210 may successfully camp on the cell on frequency A. When UE 210 has no data to receive or transmit, UE 210 may enter into a RRC idle mode. UE 210 may be configured to periodically measure the signal strength of the cell on frequency A. For example, UE 210 may be configured to measure the RSRP of the cell on frequency A. The measured RSRP value may be assumed to be, for example, −90 dB. UE 210 may be further configured to determine a cell selection RX level value (e.g., Srxlev). Srxlev may be determined according to the following equation.

$$Srxlev = Q_{rxlevmeas} - (Q_{rxlevmin} + Q_{rxlevminoffset}) - Pcompensation - Qoffset_{temp}$$

$Q_{rxlevmeas}$ may represent a measured cell RX level value (e.g., RSRP). $Q_{rxlevmin}$ may represent a minimum required RX level in the cell. $Q_{rxlevminoffset}$ may represent an offset value to the signaled $Q_{rxlevmin}$ taken into account in the Srxlev evaluation. Pcompensation may represent a compensation value in an event that an UE supports the additionalPmax. $Qoffset_{temp}$ may represent an offset value temporarily applied to a cell. The values of $Q_{rxlevmin}$, $Q_{rxlevminoffset}$, Pcompensation and $Qoffset_{temp}$ may be received from or determined according to the SIBs of the cell on frequency A. In this example, $Q_{rxlevmin}$ may be assumed to be −100 dB. $Q_{rxlevminoffset}$, Pcompensation and $Qoffset_{temp}$ may be assumed to be 0. Srxlev may be determined as 10 dB (i.e., −90−(−100+0)−0−0=10).

UE 210 may be further configured to determine whether Srxlev is less than or equal to a first threshold value (e.g., s-IntraSearch) and a second threshold value (e.g., s-NonIntraSearch). The values of s-IntraSearch and s-NonIntraSearch may be received from the SIB of the cell on frequency A. In this example, both s-IntraSearch and s-NonIntraSearch may be assumed to be 15. Accordingly, Srxlev (e.g., 10) may be less than or equal to s-IntraSearch and s-NonIntraSearch. Since Srxlev is less than or equal to the first threshold value and the second threshold value, UE 210 may be configured to perform intra-frequency and inter-frequency measurements.

The SIB may further carry a frequency list of at least one neighboring cell (e.g., frequency B). UE 210 may be configured to detect and measure the cell on frequency B. Assuming that the measured RSRP of the neighboring cell on frequency B may equal to −80 dB, UE 110 may be configured to determine that Srxlev may equal to 20 (i.e., −80−(−100+0)−0−0=20). UE 210 may be further configured to determine the cell-ranking criterions $R_s$ for the serving cell and $R_n$ for the neighboring cell according to the following equations.

$$R_s = Q_{meas,s} + Q_{Hyst} - Qoffset - Qoffset_{temp} + Qoffset_{SCPTM}$$

$$R_n = Q_{meas,n} - Qoffset - Qoffset_{temp} + Qoffset_{SCPTM}$$

$Q_{meas}$ may represent a RSRP measurement quality used in cell reselections. Qoffset may represent an offset value for applying to a serving frequency, an intra-frequency or an inter-frequency. $Qoffset_{temp}$ may represent an offset value temporarily applied to a cell. $Qoffset_{SCPTM}$ may represent an offset value temporarily applied to a SC-PTM frequency.

In this example, both $Qoffset_{temp}$ and $Qoffset_{SCPTM}$ may be assumed to be 0. For the serving frequency, Qoffset may equal to $QoffsetDedicated_{frequency}$ in an event that the serving frequency is other than the frequency of the dedicated frequency offset value. Otherwise, Qoffset may equal to 0. Since the frequency of the serving cell (e.g., frequency A) is the same with the frequency of the dedicated frequency offset value (e.g., frequency A), Qoffset may equal to 0. The cell-ranking criterion $R_s$ for the serving cell (e.g., frequency A) may be determined as −90 (i.e., −90+0−0−0+0=−90).

For the inter-frequency, Qoffset may equal to $QoffsetDedicated_{frequency}$ for any frequency other than the frequency of the dedicated frequency offset value. $QoffsetDedicated_{frequency}$ may be the dedicated frequency offset value corresponding to the redirection frequency (e.g., redirectedCarrierOffsetDedicated-r14: dB5). Since the frequency of the neighboring cell (e.g., frequency B) is other than the frequency of the dedicated frequency offset value (e.g., frequency A), Qoffset may equal to 5. The cell-ranking criterion $R_n$ for the neighboring cell (e.g., frequency B) may be determined as −85 (i.e., −80−5−0+0=−85). Accordingly, the cell-ranking criterion $R_n$ may be higher than the cell-ranking criterion $R_s$. UE 210 may be configured to perform cell reselection to the neighboring cell (e.g., the cell on frequency B). Then, UE 210 may successfully camp on the cell on frequency B.

After camping on the cell on frequency B, UE 210 may be configured to periodically perform RSRP measurements on the cell on frequency B. Assuming that the signal strength of the cell on frequency B may become bad and the measured RSRP of the current serving cell (e.g., the cell on frequency B) may drop to −91 dB, Srxlev may be determined as 9 dB (i.e., −91−(−100+0)−0−0=9).

Similarly, UE 210 may be further configured to determine whether Srxlev is less than or equal to s-IntraSearch and s-NonIntraSearch. The values of s-IntraSearch and s-NonIntraSearch may be received from the SIB of the cell on frequency B. In this example, both s-IntraSearch and s-NonIntraSearch may be assumed to be 15. Accordingly, Srxlev (e.g., 9) may be less than or equal to s-IntraSearch and s-NonIntraSearch. Since Srxlev is less than or equal to the first threshold value and the second threshold value, UE 210 may be configured to perform intra-frequency and inter-frequency measurements.

The SIB may further carry a frequency list of at least one neighboring cell (e.g., frequency A). UE 210 may be configured to detect and measure the cell on frequency A. Assuming that the measured RSRP of the neighboring cell on frequency A may equal to −90 dB, UE 210 may be configured to determine that Srxlev may equal to 10 (i.e., −90−(−100+0)−0−0=10). UE 210 may be further configured to determine the cell-ranking criterions $R_s$ for the serving cell and $R_n$ for the neighboring cell according to the same equations as illustrated above.

In this example, both $Qoffset_{temp}$ and $Qoffset_{SCPTM}$ may be assumed to be 0. For the serving frequency, Qoffset may equal to $QoffsetDedicated_{frequency}$ in an event that the serving frequency is other than the frequency of the dedicated frequency offset value. Since the frequency of the serving cell (e.g., frequency B) is other than the frequency of the dedicated frequency offset value (e.g., frequency A), Qoffset may equal to $QoffsetDedicated_{frequency}$. $QoffsetDedicated_{frequency}$ may be the dedicated frequency offset value corresponding to the redirection frequency (e.g., redirectedCarrierOffsetDedicated-r14: dB5). The cell-ranking criterion $R_s$ for the serving cell (e.g., frequency B) may be determined as −95 (i.e., −90+0−5−0+0=−95).

For the inter-frequency, Qoffset may equal to 0 since the frequency of the neighboring cell (e.g., frequency A) is the same with the frequency of the dedicated frequency offset value. $QoffsetDedicated_{frequency}$ may not be applied to the frequency of the dedicated frequency offset value. The cell-ranking criterion $R_n$ for the neighboring cell (e.g., frequency A) may be determined as −91 (i.e., −91−0−0+0=−91). Accordingly, the cell-ranking criterion $R_n$ may be higher than the cell-ranking criterion $R_s$. UE 210 may be configured to perform cell reselection to the neighboring cell (e.g., the cell on frequency A).

By considering the dedicated frequency offset value when determining the cell-ranking criterion $R_s$ for the serving cell, the UE may have higher chances to perform reselection to the redirection frequency when the UE does not camp on the preferred cell on the redirection frequency. In some implementations, Qoffset may also be applied to an intra-frequency. Specifically, for the intra-frequency, Qoffset may equal to QoffsetDedicated$_{frequency}$ in an event that the intra-frequency is other than the frequency of the dedicated frequency offset value. Otherwise, Qoffset may equal to Qoffset$_{s,n}$ in an event that Qoffset$_{s,n}$ is valid. In an event that both QoffsetDedicated$_{frequency}$ and Qoffset$_{s,n}$ are not valid, Qoffset may equal to 0.

For example, when determining the cell-ranking criterion $R_n$ for an intra-frequency neighboring cell, Qoffset may equal to QoffsetDedicated$_{frequency}$ in an event that the intra-frequency is other than the frequency of the dedicated frequency offset value. Since the frequency of the intra-frequency neighboring cell (e.g., frequency C) is other than the frequency of the dedicated frequency offset value (e.g., frequency A), Qoffset may equal to QoffsetDedicated$_{frequency}$. QoffsetDedicated$_{frequency}$ may be the dedicated frequency offset value corresponding to the redirection frequency (e.g., redirectedCarrierOffsetDedicated-r14: dB5). Assuming that the measured RSRP of the intra-frequency neighboring cell may be −90 dB, the cell-ranking criterion $R_n$ for the intra-frequency neighboring cell (e.g., frequency C) may be determined as −95 (i.e., −90−5−0+0=−95). Accordingly, the cell-ranking criterion $R_n$ for the inter-frequency cell may still be higher than the cell-ranking criterion $R_n$ for the intra-frequency neighboring cell. UE 210 may be configured to perform cell reselection to the cell on frequency A.

Illustrative Implementations

Figure 3:
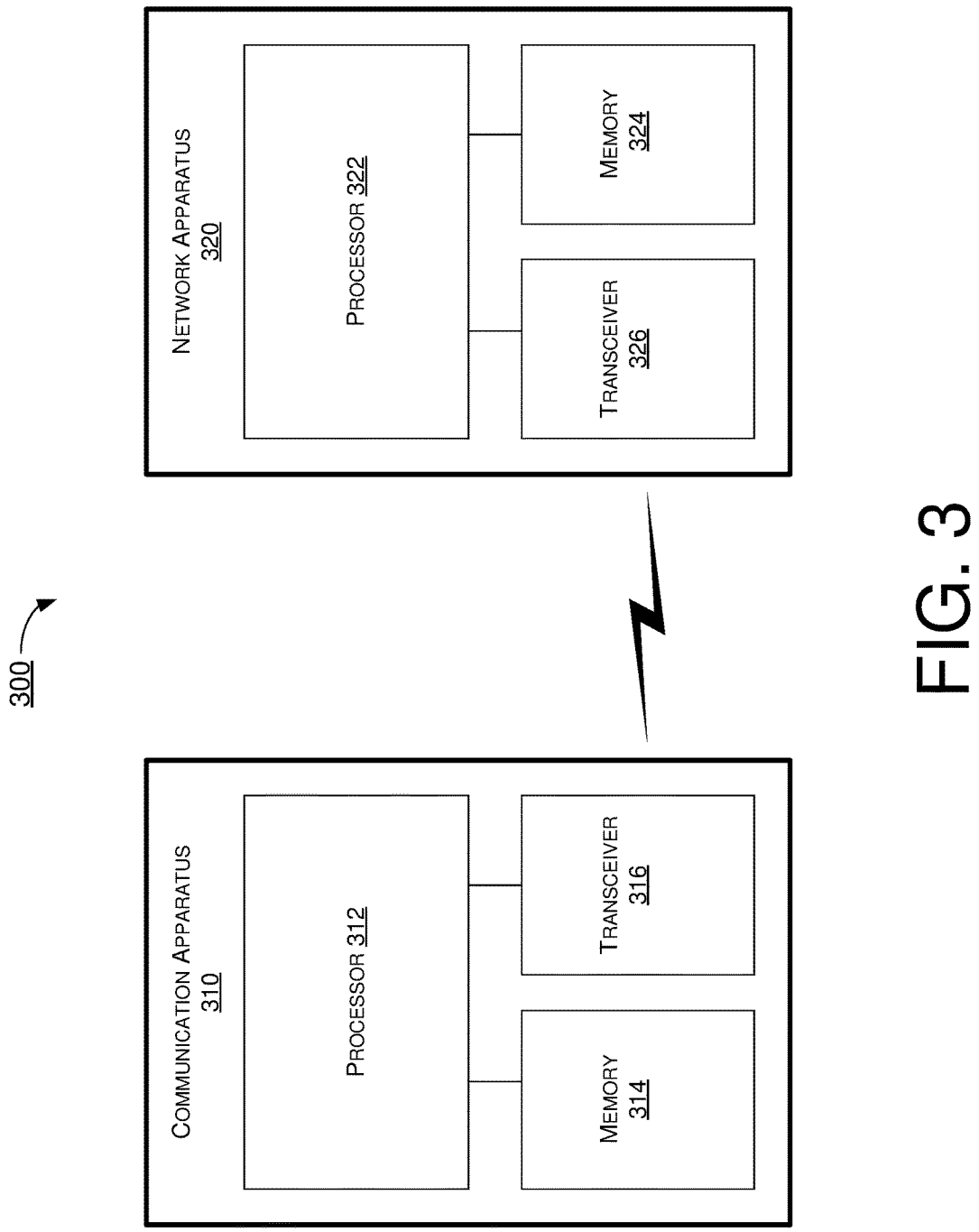
FIG. 3 is a block diagram of an example communication apparatus and an example network apparatus in accordance with an implementation of the present disclosure.

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to cell reselection with respect to user equipment and network apparatus in wireless communications, including scenarios 100 and 200 described above as well as processes 400 and 500 described below.

Communication apparatus 310 may be a part of an electronic apparatus, which may be a user equipment (UE) such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT or NB-IoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, or one or more complex-instruction-set-computing (CISC) processors. Communication apparatus 310 may include at least some of those components shown in FIG. 3 such as a processor 312, for example. communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in a LTE, LTE-Advanced or LTE-Advanced Pro network or in a gNB in a 5G, NR, IoT or NB-IoT network. Alternatively, network apparatus 320 may be implemented in the form of one or more IC chips such as, for example and without limitation, one or more single-core processors, one or more multi-core processors, or one or more CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may be configured to camp on network apparatus 320 and in a RRC connected mode. Then, processor 322 may be configured to transmit, via transceiver 326, a RRC connection release message (e.g., RRCConnectionRelease) to communication apparatus 310. Processor 322 may use the RRC connection release message to release the connection between network apparatus 320 and communication apparatus 310 and redirect communication apparatus 310 to a preferred cell. The RRC connection release message may comprise information including a redirection frequency (e.g., redirectedCarrierInfor-r13: Frequency A) and a dedicated frequency offset value corresponding to the redirection frequency (e.g., redirectedCarrierOffsetDedicated-r14: dB5). Processor 322 may use the redirection frequency to indicate the frequency (e.g., frequency A) of the preferred cell for communication apparatus 310 to perform cell selection. Processor 312 may use the dedicated frequency offset value to determine a cell-ranking criterion when performing cell reselection procedures. In some implementations, processor 322 may further include a timer value (e.g., t322) for the dedicated frequency offset value in the RRC connection release message. Processor 312 may use the timer value to count the valid time period for applying the dedicated frequency offset value.

In some implementations, after receiving the RRC connection release message, processor 312 may be configured to perform cell selection to select the cell on frequency A. Processor 312 may successfully camp on the cell on frequency A. When processor 312 has no data to receive or transmit, processor 312 may enter into a RRC idle mode. Processor 312 may be configured to periodically measure the signal strength of the cell on frequency A. For example, processor 312 may be configured to measure the RSRP of the cell on frequency A. The measured RSRP value may be assumed to be, for example, −90 dB. Processor 312 may be further configured to determine a cell selection RX level value (e.g., Srxlev) according to the following equation.

$$Srxlev=Q_{rxlevmeas}-(Q_{rxlevmin}+Q_{rxlevminoffset})-Pcompensation-Qoffset_{temp}$$

In some implementations, $Q_{rxlevmin}$ may be assumed to be −100 dB. $Q_{rxlevminoffset}$, Pcompensation and $Qoffset_{temp}$ may be assumed to be 0. Processor 312 may be configured to determine Srxlev as 10 dB (i.e., −90−(−100+0)−0−0=10).

In some implementations, processor 312 may be further configured to determine whether Srxlev is less than or equal to a first threshold value (e.g., s-IntraSearch) and a second threshold value (e.g., s-NonIntraSearch). processor 312 may be further configured to receive, via transceiver 316, the values of s-IntraSearch and s-NonIntraSearch from the SIB of the cell on frequency A. In some implementations, both s-IntraSearch and s-NonIntraSearch may be assumed to be 15. Accordingly, processor 312 may determine that Srxlev (e.g., 10) may be less than or equal to s-IntraSearch and s-NonIntraSearch. Since Srxlev is less than or equal to the first threshold value and the second threshold value, processor 312 may be configured to perform intra-frequency and inter-frequency measurements.

In some implementations, processor 312 may be further configured to receive, via transceiver 316, a frequency list of at least one neighboring cell (e.g., frequency B) from the SIB. Processor 312 may be configured to detect and measure the cell on frequency B. Assuming that the measured RSRP of the neighboring cell on frequency B may equal to −80 dB, processor 312 may be configured to determine that Srxlev may equal to 20 (i.e., −80−(−100+0)−0−0=20). Processor 312 may be further configured to determine the cell-ranking criterions $R_s$ for the serving cell and $R_n$ for the neighboring cell according to the following equations.

$$R_s=Q_{meas,s}+Q_{Hyst}-Qoffset-Qoffset_{temp}+Qoffset_{SCPTM}$$

$$R_n=Q_{meas,n}-Qoffset-Qoffset_{temp}+Qoffset_{SCPTM}$$

In some implementations, both $Qoffset_{temp}$ and $Qoffset_{SCPTM}$ may be assumed to be 0. For the serving frequency, Qoffset may equal to $QoffsetDedicated_{frequency}$ in an event that the serving frequency is other than the frequency of the dedicated frequency offset value. Otherwise, Qoffset may equal to 0. Since the frequency of the serving cell (e.g., frequency A) is the same with the frequency of the dedicated frequency offset value (e.g., frequency A), processor 312 may determine that Qoffset may equal to 0. Processor 312 may determine the cell-ranking criterion $R_s$ for the serving cell (e.g., frequency A) as −90 (i.e., −90+0−0−0+0=−90).

In some implementations, for the inter-frequency, Qoffset may equal to $QoffsetDedicated_{frequency}$ for any frequency other than the frequency of the dedicated frequency offset value. $QoffsetDedicated_{frequency}$ may be the dedicated frequency offset value corresponding to the redirection frequency (e.g., redirectedCarrierOffsetDedicated-r14: dB5). Since the frequency of the neighboring cell (e.g., frequency B) is other than the frequency of the dedicated frequency offset value (e.g., frequency A), processor 312 may determine that Qoffset may equal to 5. Processor 312 may determine the cell-ranking criterion $R_n$ for the neighboring cell (e.g., frequency B) as −85 (i.e., −80−5−0+0=−85). Accordingly, the cell-ranking criterion $R_n$ may be higher than the cell-ranking criterion $R_s$. Processor 312 may be configured to perform cell reselection to the neighboring cell (e.g., the cell on frequency B). Then, processor 312 may successfully camp on the cell on frequency B.

In some implementations, after camping on the cell on frequency B, processor 312 may be configured to periodically perform RSRP measurements on the cell on frequency B. Assuming that the signal strength of the cell on frequency B may become bad and the measured RSRP of the current serving cell (e.g., the cell on frequency B) may drop to −91 dB, processor 312 may determine that Srxlev may be 9 dB (i.e., −91−(−100+0)−0−0=9).

In some implementations, processor 312 may be further configured to determine whether Srxlev is less than or equal to s-IntraSearch and s-NonIntraSearch. The values of s-IntraSearch and s-NonIntraSearch may be received from the SIB of the cell on frequency B. In some implementations, both s-IntraSearch and s-NonIntraSearch may be assumed to be 15. Accordingly, processor 312 may determine that Srxlev (e.g., 9) may be less than or equal to s-IntraSearch and s-NonIntraSearch. Since Srxlev is less than or equal to the first threshold value and the second threshold value, processor 312 may be configured to perform intra-frequency and inter-frequency measurements.

In some implementations, processor 312 may be configured to receive, via transceiver 316, a frequency list of at least one neighboring cell (e.g., frequency A) from SIB. processor 312 may be configured to detect and measure the cell on frequency A. Assuming that the measured RSRP of the neighboring cell on frequency A may equal to −90 dB, processor 312 may be configured to determine that Srxlev may equal to 10 (i.e., −90−(−100+0)−0−0=10). Processor 312 may be further configured to determine the cell-ranking criterions $R_s$ for the serving cell and $R_n$ for the neighboring cell according to the same equations as illustrated above.

In some implementations, both $Qoffset_{temp}$ and $Qoffset_{SCPTM}$ may be assumed to be 0. For the serving frequency, Qoffset may equal to $QoffsetDedicated_{frequency}$ in an event that the serving frequency is other than the frequency of the dedicated frequency offset value. Since the frequency of the serving cell (e.g., frequency B) is other than the frequency of the dedicated frequency offset value (e.g., frequency A), processor 312 may determine that Qoffset may equal to $QoffsetDedicated_{frequency}$. $QoffsetDedicated_{frequency}$ may be the dedicated frequency offset value corresponding to the redirection frequency (e.g., redirectedCarrierOffsetDedicated-r14: dB5). Processor 312 may determine the cell-ranking criterion $R_s$ for the serving cell (e.g., frequency B) as −95 (i.e., −90+0−5−0+0=−95).

In some implementations, for the inter-frequency, Qoffset may equal to 0 since the frequency of the neighboring cell (e.g., frequency A) is the same with the frequency of the dedicated frequency offset value. $QoffsetDedicated_{frequency}$ may not be applied to the frequency of the dedicated frequency offset value. Processor 312 may determine the cell-ranking criterion $R_n$ for the neighboring cell (e.g., frequency A) as −91 (i.e., −91−0−0+0=−91). Accordingly, the cell-ranking criterion $R_n$ may be higher than the cell-ranking criterion $R_s$. Processor 312 may be configured to perform cell reselection to the neighboring cell (e.g., the cell on frequency A).

In some implementations, by considering the dedicated frequency offset value when determining the cell-ranking criterion $R_s$ for the serving cell, processor 312 may have higher chances to perform reselection to the redirection frequency when processor 312 does not camp on the preferred cell on the redirection frequency. In some implementations, Qoffset may also be applied to an intra-frequency. Specifically, for the intra-frequency, Qoffset may equal to $QoffsetDedicated_{frequency}$ in an event that the intra-frequency is other than the frequency of the dedicated frequency offset value.

In some implementations, when determining the cell-ranking criterion $R_n$ for an intra-frequency neighboring cell, Qoffset may equal to $QoffsetDedicated_{frequency}$ in an event that the intra-frequency is other than the frequency of the dedicated frequency offset value. Since the frequency of the intra-frequency neighboring cell (e.g., frequency C) is other than the frequency of the dedicated frequency offset value (e.g., frequency A), processor 312 may determine that Qoffset may equal to $QoffsetDedicated_{frequency}$. $QoffsetDedicated_{frequency}$ may be the dedicated frequency offset value corresponding to the redirection frequency (e.g., redirectedCarrierOffsetDedicated-r14: dB5). Assuming that the measured RSRP of the intra-frequency neighboring cell may be −90 dB, processor 312 may determine the cell-ranking criterion $R_n$ for the intra-frequency neighboring cell (e.g., frequency C) as −95 (i.e., −90−5−0+0=−95). Accordingly, the cell-ranking criterion $R_n$ for the inter-frequency cell may still be higher than the cell-ranking criterion $R_n$ for the intra-frequency neighboring cell. Processor 312 may be configured to perform cell reselection to the cell on frequency A.

Illustrative Processes

Figure 4:
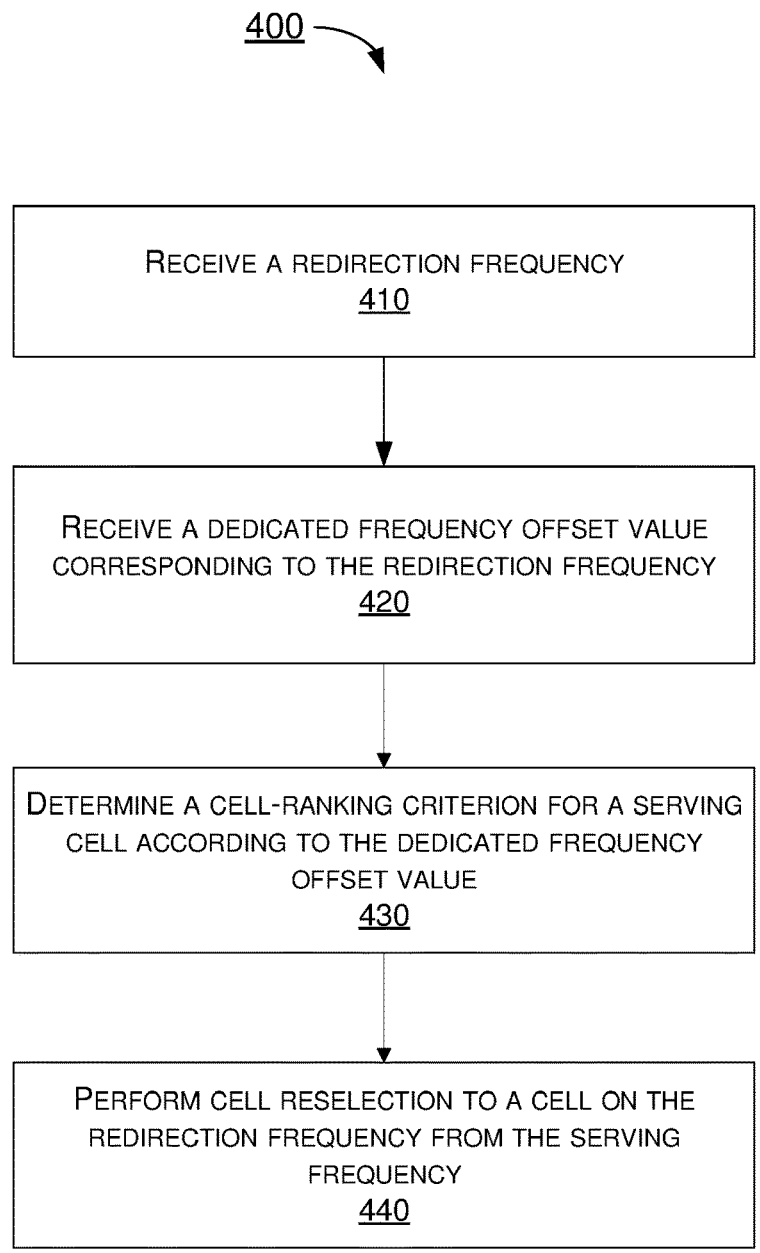
FIG. 4 is a flowchart of an example process in accordance with an implementation of the present disclosure.

FIG. 4 illustrates an example process 400 in accordance with an implementation of the present disclosure. Process 400 may be an example implementation of scenarios 100 and 200, whether partially or completely, with respect to cell reselection in accordance with the present disclosure. Process 400 may represent an aspect of implementation of features of communication apparatus 310. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve communication apparatus 310 receiving a redirection frequency. Process 400 may proceed from 410 to 420.

At 420, process 400 may involve communication apparatus 310 receiving a dedicated frequency offset value corresponding to the redirection frequency. Process 400 may proceed from 420 to 430.

At 430, process 400 may involve communication apparatus 310 determining a cell-ranking criterion for a serving cell according to the dedicated frequency offset value. Process 400 may proceed from 430 to 440.

At 440, process 400 may involve communication apparatus 310 performing cell reselection to a cell on the redirection frequency from the serving cell.

In some implementations, process 400 may involve communication apparatus 310 determining the cell-ranking criterion by subtracting the dedicated frequency offset value from a measurement value of the serving cell. The cell-ranking criterion for the serving cell may be lower than a cell-ranking criterion for the cell on the redirection frequency after subtracting the dedicated frequency offset value. The frequency of the serving cell may be different from the redirection frequency.

In some implementations, process 400 may involve communication apparatus 310 receiving a valid timer value for the dedicated frequency offset value. Process 400 may involve communication apparatus 310 using the timer value to count the valid time period for applying the dedicated frequency offset value.

Figure 5:
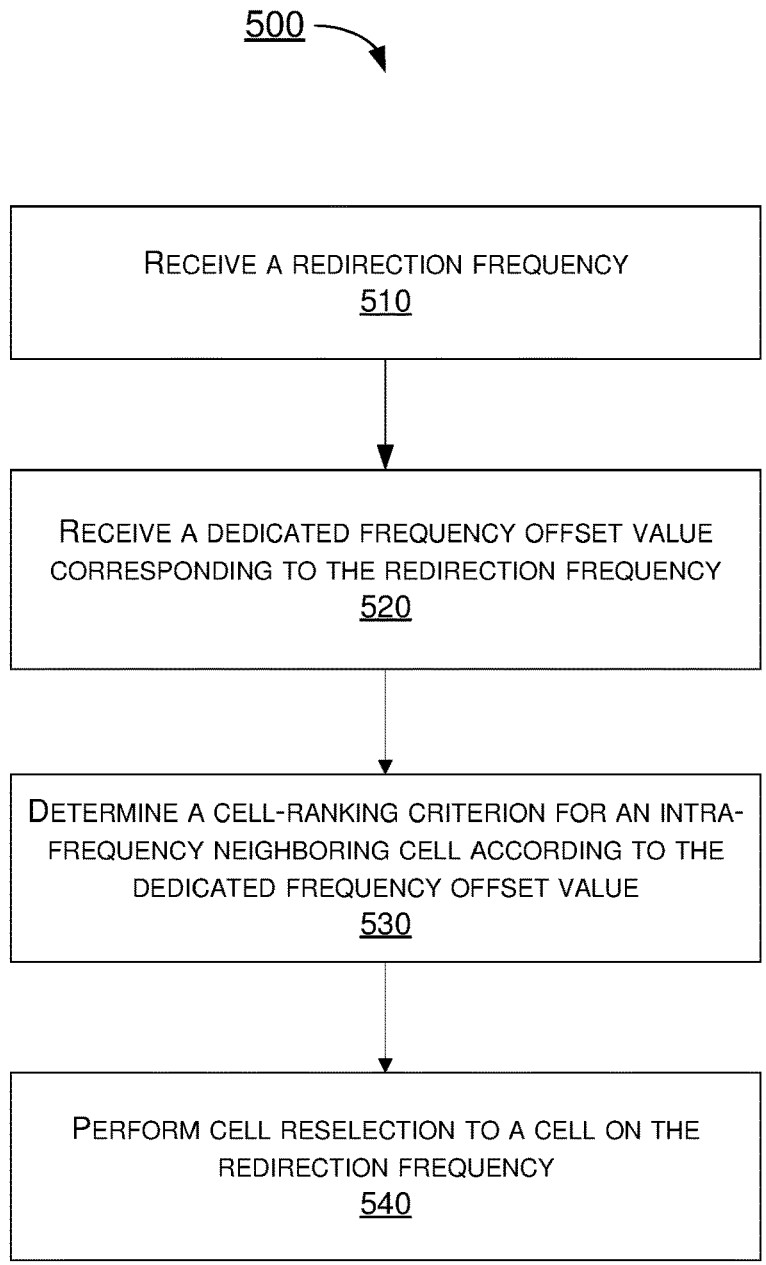
FIG. 5 is a flowchart of an example process in accordance with an implementation of the present disclosure.

FIG. 5 illustrates an example process 500 in accordance with an implementation of the present disclosure. Process 500 may be an example implementation of scenarios 100 and 200, whether partially or completely, with respect to cell reselection in accordance with the present disclosure. Process 500 may represent an aspect of implementation of features of communication apparatus 310. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 510 or any suitable UE or machine type devices. Solely for illustrative purposes and without limitation, process 500 is described below in the context of communication apparatus 310. Process 500 may begin at block 510.

At 510, process 500 may involve communication apparatus 310 receiving a redirection frequency. Process 500 may proceed from 510 to 520.

At 520, process 500 may involve communication apparatus 310 receiving a dedicated frequency offset value corresponding to the redirection frequency. Process 500 may proceed from 520 to 530.

At 530, process 500 may involve communication apparatus 310 determining a cell-ranking criterion for an intra-frequency neighboring cell according to the dedicated frequency offset value. Process 500 may proceed from 530 to 540.

At 540, process 500 may involve communication apparatus 310 performing cell reselection to a cell on the redirection frequency.

In some implementations, process 500 may involve communication apparatus 310 determining the cell-ranking criterion by subtracting the dedicated frequency offset value from a measurement value of the intra-frequency neighboring cell. The cell-ranking criterion for the intra-frequency neighboring cell may be lower than a cell-ranking criterion for the cell on the redirection frequency after subtracting the dedicated frequency offset value. The frequency of the intra-frequency neighboring cell may be different from the redirection frequency.

In some implementations, process 500 may involve communication apparatus 310 receiving a valid timer value for the dedicated frequency offset value. Process 500 may involve communication apparatus 310 using the timer value to count the valid time period for applying the dedicated frequency offset value.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving, by a processor of an apparatus, a redirection frequency;
    receiving, by the processor, a dedicated frequency offset value corresponding to the redirection frequency;
    determining, by the processor, a cell-ranking criterion for a serving cell according to the dedicated frequency offset value by:

counting, based on a valid timer value for the dedicated frequency offset value, a time period in applying the dedicated frequency offset value in the determining of the cell-ranking criterion;

measuring a reference symbol received power (RSRP) of the serving cell;

measuring a RSRP of a neighboring cell at a the redirection frequency;

and comparing results of the measuring of the RSRP of the serving cell and the measuring of the RSRP of the neighboring cell; and performing, by the processor, cell reselection to the neighboring cell at the redirection frequency from the serving cell based on a result of the comparing.

2. The method of claim 1, wherein the determining comprising determining the cell-ranking criterion by subtracting the dedicated frequency offset value from a measurement value of the serving cell.

3. The method of claim 2, wherein the cell-ranking criterion for the serving cell is lower than a cell-ranking criterion for the cell at the redirection frequency after subtracting the dedicated frequency offset value.

4. The method of claim 1, wherein a dedicated frequency of the serving cell is different from the redirection frequency.

5. The method of claim 1, further comprising:
receiving, by the processor, the valid timer value for the dedicated frequency offset value.

6. A method, comprising:
receiving, by a processor of an apparatus, a redirection frequency;
receiving, by the processor, a dedicated frequency offset value corresponding to the redirection frequency;
determining, by the processor, a cell-ranking criterion for an intra-frequency neighboring cell according to the dedicated frequency offset value by:
counting, based on a valid timer value for the dedicated frequency offset value, a time period in applying the dedicated frequency offset value in the determining of the cell-ranking criterion;
measuring a reference symbol received power (RSRP) of a cell at the redirection frequency;
measuring a RSRP of the intra-frequency neighboring cell at a different frequency; and
comparing results of the measuring of the RSRP of the cell at the redirection frequency and the measuring of the RSRP of the intra-frequency neighboring cell; and
performing, by the processor, cell reselection to the cell at the redirection frequency based on a result of the comparing.

7. The method of claim 6, wherein the determining comprising determining the cell-ranking criterion by subtracting the dedicated frequency offset value from a measurement value of the intra-frequency neighboring cell.

8. The method of claim 7, wherein the cell-ranking criterion for the intra-frequency neighboring cell is lower than a cell-ranking criterion for the cell at the redirection frequency after subtracting the dedicated frequency offset value.

9. The method of claim 6, wherein a dedicated frequency of the intra-frequency neighboring cell is different from the redirection frequency.

10. The method of claim 6, further comprising:
receiving, by the processor, the valid timer value for the dedicated frequency offset value.

11. An apparatus, comprising:
a transceiver capable of wirelessly communicating with a plurality of cells of a wireless network; and
a processor communicatively coupled to the transceiver, the processor capable of:
receiving, via the transceiver, a redirection frequency;
receiving, via the transceiver, a dedicated frequency offset value corresponding to the redirection frequency;
determining a cell-ranking criterion for a serving cell according to the dedicated frequency offset value by:
counting, based on a valid timer value for the dedicated frequency offset value, a time period in applying the dedicated frequency offset value in the determining of the cell-ranking criterion;
measuring a reference symbol received power (RSRP) of the serving cell;
measuring a RSRP of a neighboring cell at a the redirection frequency; and
comparing results of the measuring of the RSRP of the serving cell and the measuring of the RSRP of the neighboring cell; and
performing cell reselection to the neighboring cell at the redirection frequency from the serving cell based on a result of the comparing.

12. The apparatus of claim 11, wherein, in determining the cell-ranking criterion, the processor determines the cell-ranking criterion by subtracting the dedicated frequency offset value from a measurement value of the serving cell.

13. The apparatus of claim 12, wherein the cell-ranking criterion for the serving cell is lower than a cell-ranking criterion for the cell at the redirection frequency after subtracting the dedicated frequency offset value.

14. The apparatus of claim 11, wherein a frequency of the serving cell is different from the redirection frequency.

15. The apparatus of claim 11, wherein the processor is further capable of:
receiving, via the transceiver, the valid timer value for the dedicated frequency offset value.

16. An apparatus, comprising:
a transceiver capable of wirelessly communicating with a plurality of cells of a wireless network; and
a processor communicatively coupled to the transceiver, the processor capable of:
receiving, via the transceiver, a redirection frequency;
receiving, via the transceiver, a dedicated frequency offset value corresponding to the redirection frequency;
determining a cell-ranking criterion for an intra-frequency neighboring cell according to the dedicated frequency offset value by:
counting, based on a valid timer value for the dedicated frequency offset value, a time period in applying the dedicated frequency offset value in the determining of the cell-ranking criterion;
measuring a reference symbol received power (RSRP) of a cell at the redirection frequency;
measuring a RSRP of the intra-frequency neighboring cell at a different frequency; and
comparing results of the measuring of the RSRP of the cell at the redirection frequency and the measuring of the RSRP of the intra-frequency neighboring cell; and
performing cell reselection to the cell at the redirection frequency based on a result of the comparing.

17. The apparatus of claim 16, wherein, in determining the cell-ranking criterion, the processor determines the cell-ranking criterion by subtracting the dedicated frequency offset value from a measurement value of the intra-frequency neighboring cell.

18. The apparatus of claim 17, wherein the cell-ranking criterion for the intra-frequency neighboring cell is lower than a cell-ranking criterion for the cell at the redirection frequency after subtracting the dedicated frequency offset value.

19. The apparatus of claim 16, wherein a dedicated frequency of the intra-frequency neighboring cell is different from the redirection frequency.

20. The apparatus of claim 16, wherein the processor is further capable of:
  receiving, via the transceiver, the valid timer value for the dedicated frequency offset value.

* * * * *